United States Patent
Hasegawa et al.

(10) Patent No.: US 7,805,758 B2
(45) Date of Patent: Sep. 28, 2010

(54) INFORMATION PROCESSING APPARATUS

(75) Inventors: Eiji Hasegawa, Kawasaki (JP); Fumio Honda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1348 days.

(21) Appl. No.: 10/784,184

(22) Filed: Feb. 24, 2004

(65) Prior Publication Data
US 2005/0097524 A1  May 5, 2005

(30) Foreign Application Priority Data
Oct. 31, 2003 (JP) ............................. 2003-372374

(51) Int. Cl.
*G06F 11/00* (2006.01)
(52) U.S. Cl. .............................. 726/22; 713/152; 726/5; 717/100; 705/53; 705/57
(58) Field of Classification Search ................. 725/103; 707/101, 203; 235/382, 382.5, 431; 358/1.18; 705/38, 53, 57; 717/106, 114, 100, 136, 717/120, 175; 348/E5.108, E7.071; 713/152; 726/5, 22
See application file for complete search history.

(56) References Cited

U.S. PATENT DOCUMENTS

| 4,849,927 | A | * | 7/1989 | Vos | ......................... | 235/382.5 |
| 5,148,542 | A | * | 9/1992 | Sakuma et al. | ............... | 718/107 |
| 5,701,582 | A | * | 12/1997 | DeBey | ......................... | 725/103 |
| 5,737,415 | A | | 4/1998 | Akiyama et al. | | |
| 5,878,198 | A | * | 3/1999 | Yuasa et al. | ................. | 358/1.18 |
| 6,029,149 | A | * | 2/2000 | Dykstra et al. | ................. | 705/38 |
| 6,131,192 | A | * | 10/2000 | Henry | ......................... | 717/175 |

FOREIGN PATENT DOCUMENTS

| JP | 4-3224 | 1/1992 |
| JP | 10-105658 | 4/1998 |
| JP | 11-232103 | 8/1999 |
| JP | 2000-112750 | 4/2000 |

(Continued)

OTHER PUBLICATIONS

Communication from the Japanese Patent Office mailed on Oct. 20, 2009 in the related Japanese patent application No. 2003-372374.

(Continued)

*Primary Examiner*—Thanhnga B Truong
(74) *Attorney, Agent, or Firm*—Staas & Halsey LLP

(57) ABSTRACT

An information processing apparatus has: a memory 13; CPU for executing a program written in the memory 13; a secure module 20; and storage means for storing a plurality of encrypted programs into which a program is divided. The CPU transmits the program stored in the storage means to the secure module 20. The secure module 20 has: means for receiving the program stored in the storage means, means for returning the received program to an executable state; means for writing the program, which has been returned to the executable state, in the memory 13 in a sequence for CPU to execute, and means for deleting the program from the memory 13 by CPU after execution is completed. When executing the program, the information processing apparatus can make reverse analysis by a malicious third party difficult, and enhance security of a load module to be executed.

16 Claims, 14 Drawing Sheets

FOREIGN PATENT DOCUMENTS

| | | |
|---|---|---|
| JP | 2002-99439 | 4/2002 |
| JP | 2003-198527 | 7/2003 |
| JP | 2003-208406 | 7/2003 |
| JP | 2003-223234 | 8/2003 |

OTHER PUBLICATIONS

Communication from the Japanese Patent Office mailed on Mar. 2, 2010 in the related Japanese patent application No. 2003-372374.

* cited by examiner

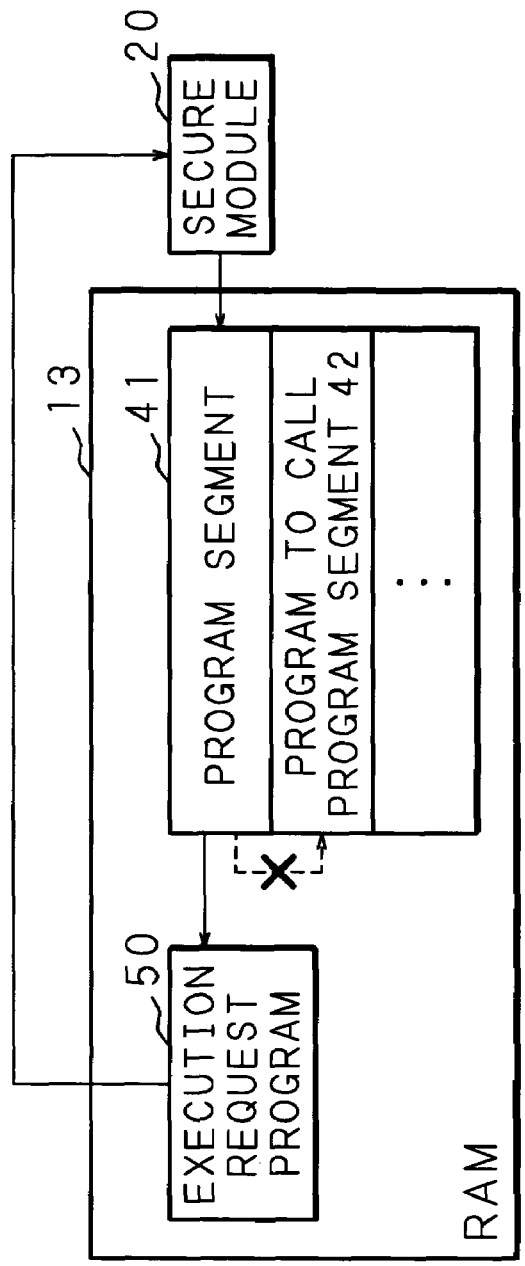
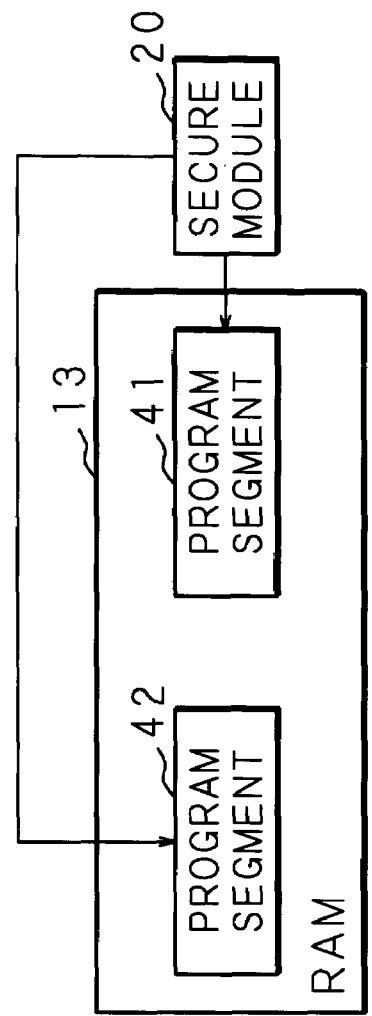
FIG. 5A
FIG. 5B

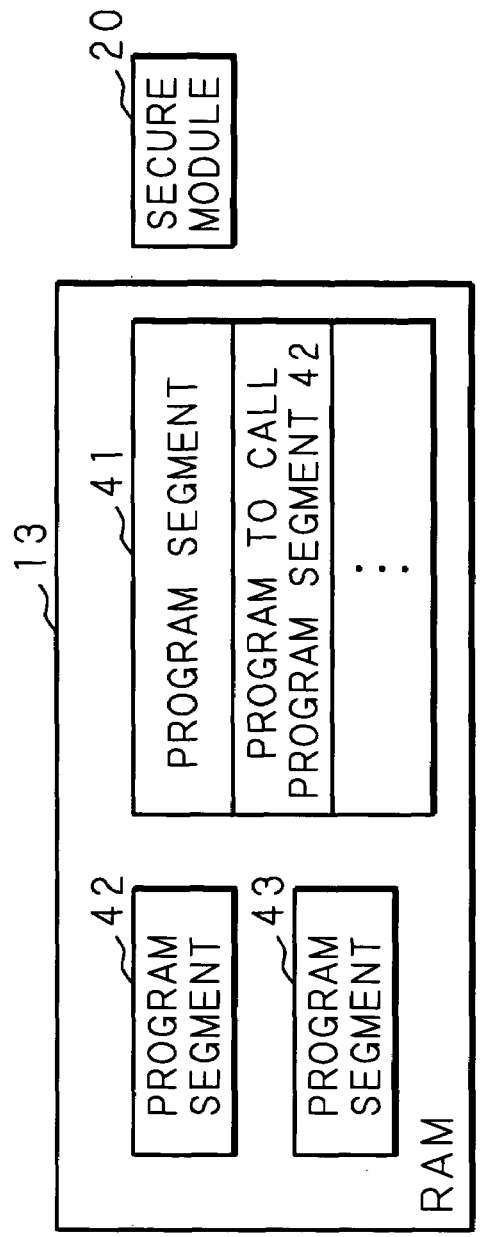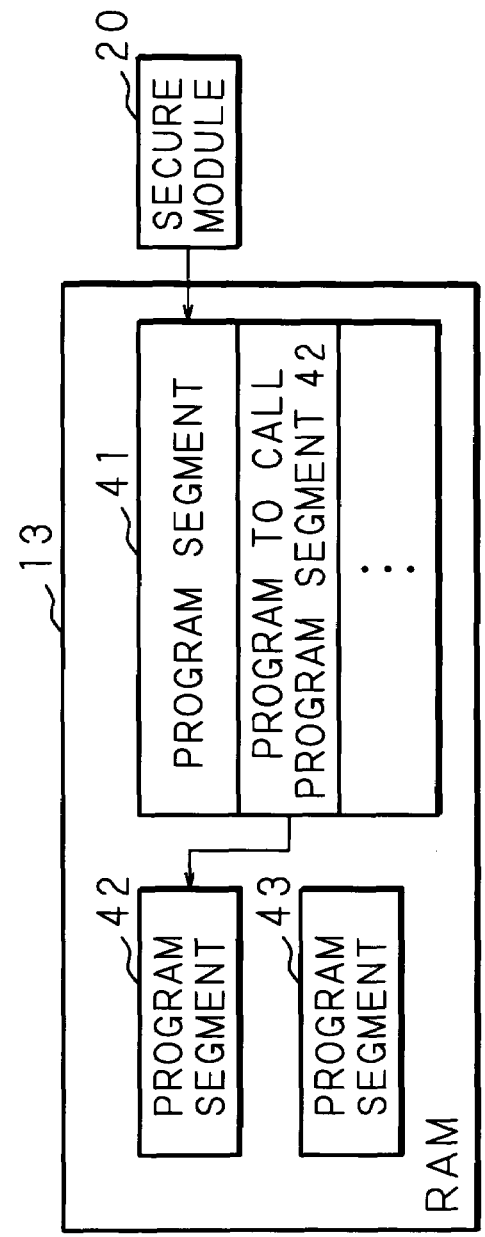
FIG. 6A
FIG. 6B

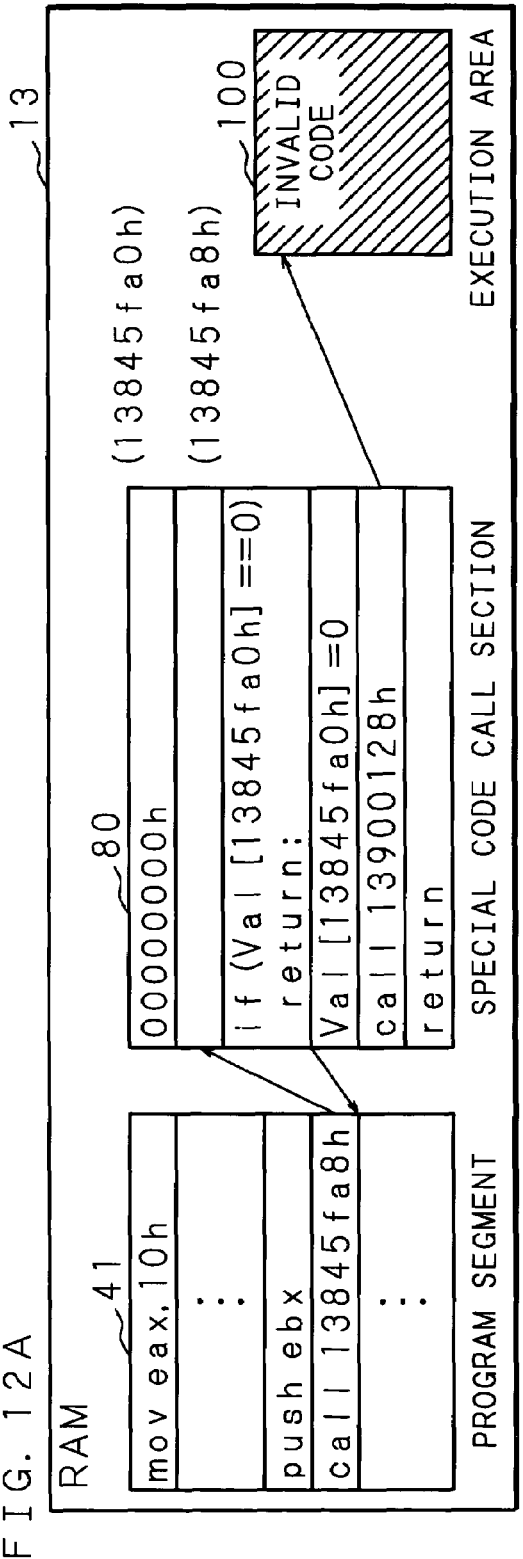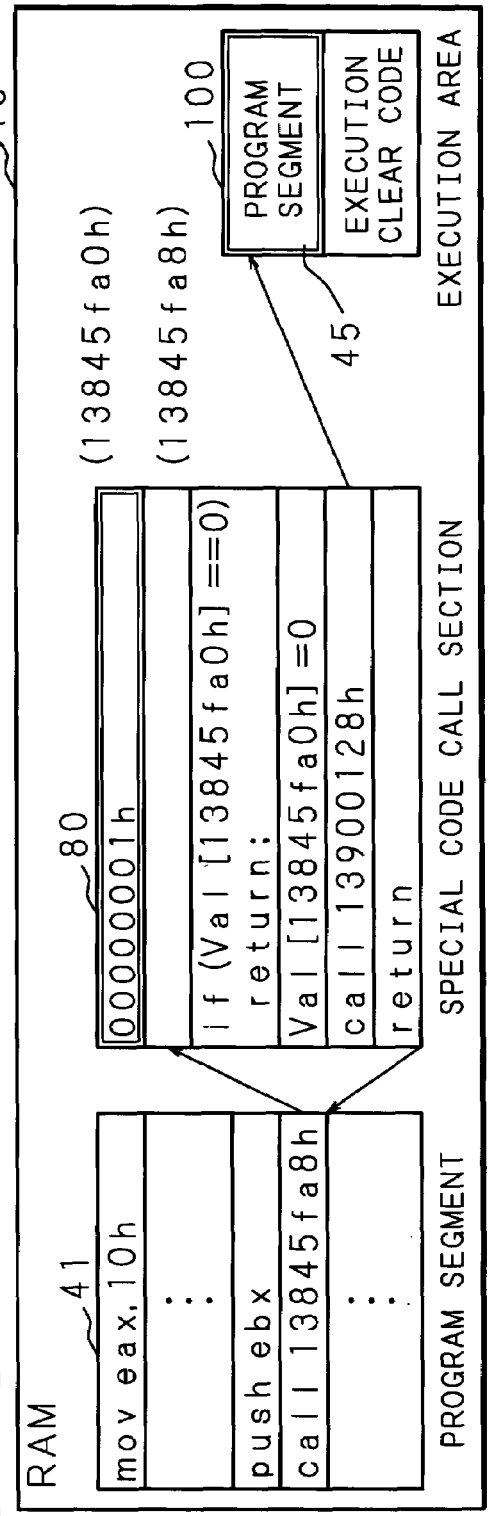

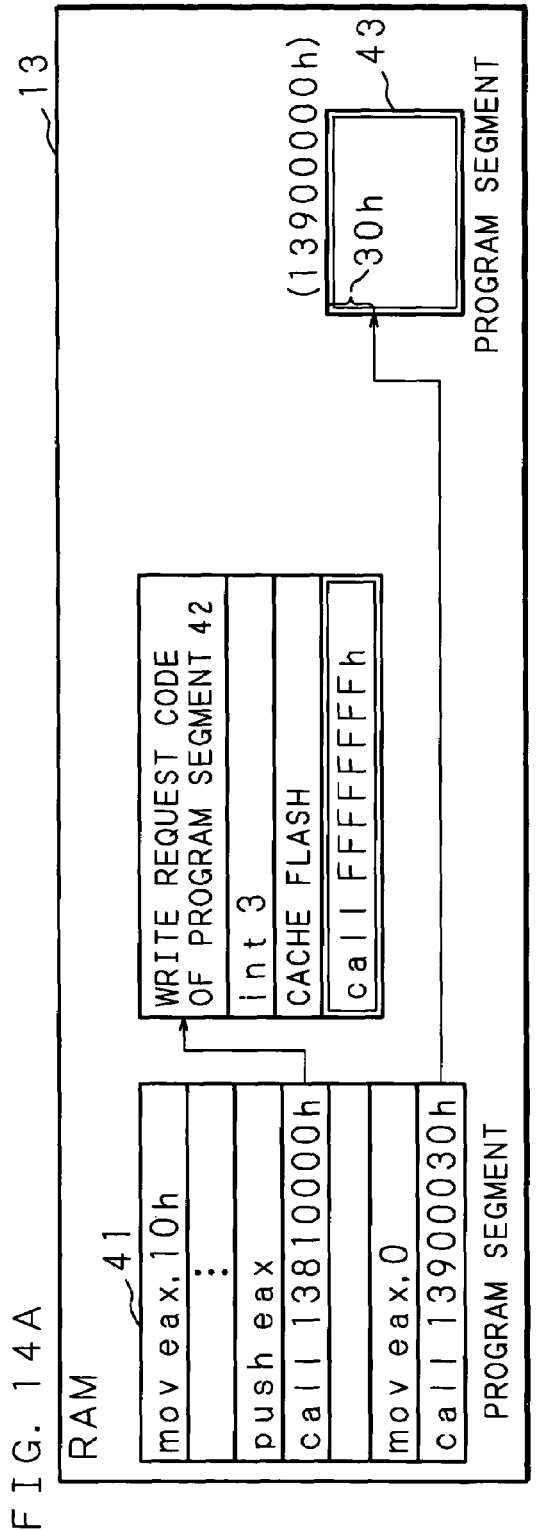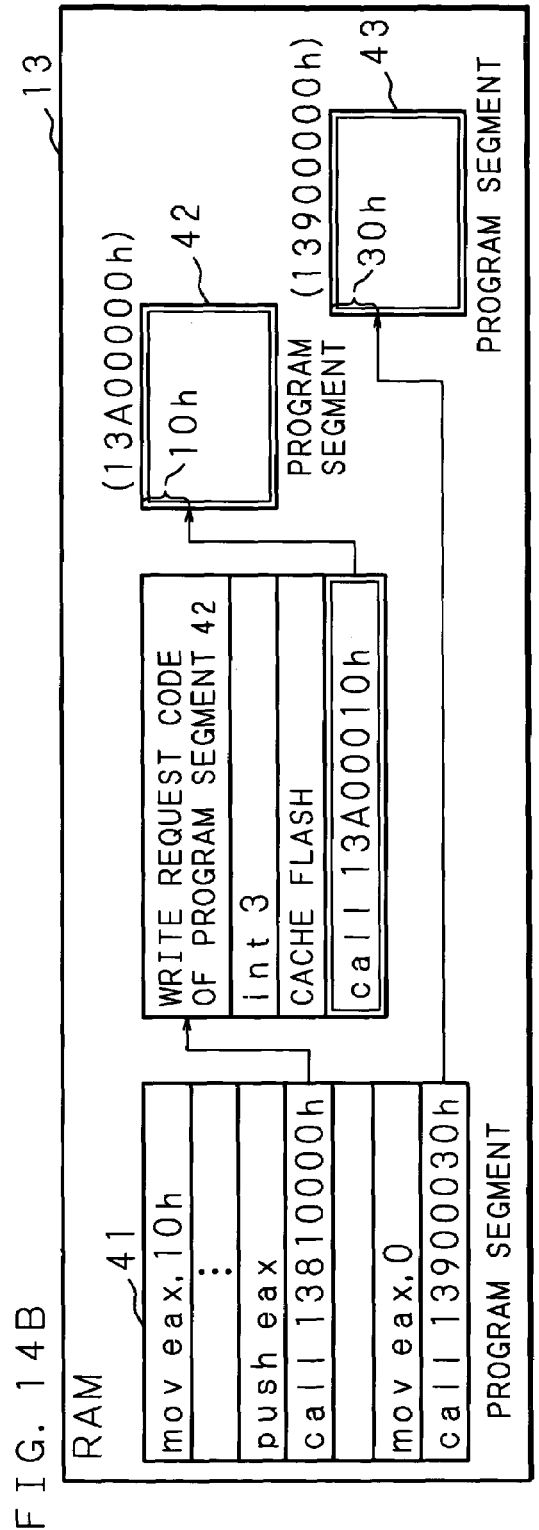

INFORMATION PROCESSING APPARATUS

BACKGROUND OF THE INVENTION

1. Field of the Invention

The present invention relates to an information processing apparatus which makes an analysis by a malicious third party difficult when executing a program. In particular, the present invention relates to an information processing apparatus using a secure module, which is detachably mounted to the information processing apparatus and executes a process on security when executing a program.

2. Description of Related Art

Recently, an always-on connection environment represented by the broadband Internet has become widespread, and technologies for ensuring security against execution, update or the like of unauthorized programs by a malicious third party have received attention. In particular, a personal computer (hereinafter, referred to as "PC") has open architecture, and programs which are executed on the PC are described as program code in a format in accordance with an operating system (hereinafter, referred to as OS), or a processor. Therefore, since everyone can basically examine and understand the content of the program code in a main memory on the PC or in a storage medium, there are problems that it is difficult to ensure security of the program, the content managed through the program, or the like.

In order to solve these problems, countermeasures of, for example making a reverse analysis difficult by complicating a logic of the program, encrypting the program, dynamically executing the program while writing it in the memory (see Japanese Patent Application Laid-Open No. 11-232103 (1999)) or the like have been conventionally taken using technologies of making the program to be executed secure or difficult to be read.

Moreover, disclosed in Japanese Patent Application Laid-Open No. 2003-198527 is a technology of combining a secure module having an area therein, which cannot be analyzed or accessed, with an information processing apparatus having the open architecture as an external module and writing a program in a memory using the secure module. When using such technology, since the program is encrypted using information that cannot be analyzed or accessed from the outside while the program is stored in a storage medium, the analysis of content by the third party is prevented. Moreover, by monitoring a memory, in which the program is written, using the secure module which operates independently of a processor, the security of the program to be executed is further enhanced.

BRIEF SUMMARY OF THE INVENTION

The present invention has been made in view of such a situation, and the object thereof is to provide an information processing apparatus which makes a reverse analysis by a malicious third party difficult, and enhances security of a program to be executed, when executing the program.

In order to achieve the object described above, an information processing apparatus according to the present invention comprises: a memory; a CPU for executing a program written in the memory; a secure module; and storage means for storing encrypted programs. The storage means stores the encrypted programs in a form which can be decrypted only by the secure module so that a reverse analysis cannot be made. The CPU is designed to transmit the program stored in the storage means to the secure module. The secure module comprises: means for receiving the program stored in the storage means; means for returning the received program to an executable state; means for writing the program, which has been returned to the executable state, in the memory in a sequence for the CPU to execute; and means for deleting the program, which has been executed by the CPU, from the memory after the execution is completed.

In this information processing apparatus, the program is divided into a plurality of encrypted programs to be stored, is returned to the executable state by the divided program, and is written in the memory in the execution sequence. A program, which has already been executed, is deleted from the memory by a program for deleting program data, or the secure module, which writes an invalid code over an execution completion area in a program code by embedding codes, such as zero strings, nop strings or the like. Thereby, not all contents of the program are written in the memory during the execution, but only a part of the program is written in the memory during the execution. Therefore, even when a malicious third party has fraudulently acquired the image copy of the content in the memory, since the content of the whole program is not acquirable, the program content can not be analyzed, and thereby it becomes possible to ensure the security of the program to be executed.

Moreover, in the information processing apparatus, the secure module may comprise means for judging whether an execution request signal for the divided program has been received or not, and when this means judges that the execution request signal has been received, the received program may be returned to the executable state.

In this information processing apparatus, after receiving the execution request signal for the divided program, the divided program, which is a request object, is returned to the executable state and is written in the memory. Thereby, since the program is stored in the memory for the first time at a point in time when the execution request is generated, a part of the program has not been written in the memory until an execution request is generated. Therefore, even when the content of the memory has been accessed from the outside, it is difficult to grasp the content of the whole program, and thereby it becomes possible to further enhance the security of the program to be executed.

Moreover, in the information processing apparatus, the secure module may comprise means for storing information to identify the divided program to judge whether the divided program is a program which is made resident in the memory before the program is executed, or a program which is not to be written in the memory until the program is executed.

In this information processing apparatus, information which identifies a program to judge whether or not it is a program which may be always written in the memory is given based on importance, confidentiality or the like of the divided program. Thereby, by always writing a program having low importance, confidentiality or the like in the memory, and by writing a program having high importance, confidentiality or the like in the memory only during the execution, the security of the execution can be enhanced only for the required program, and it becomes possible to reduce overhead of the program due to the process for ensuring the security.

Moreover, another information processing apparatus according to the present invention comprises: a memory; a CPU for executing a program written in the memory; a secure module; and storage means for storing encrypted programs. The CPU is designed to transmit the program stored in the storage means to the secure module. The secure module comprises: means for receiving the program stored in the storage means; means for dividing the received program into a plurality of programs; means for returning the divided program to an executable state; means for writing the program, which has been returned to the executable state, in the memory in a sequence for the CPU to execute; and means for deleting the program, which has been executed by the CPU, from the memory after the execution is completed.

In this information processing apparatus, the secure module divides a stored encrypted program into a plurality of programs, returns them to an executable state by the divided program, and writes them in the memory in a sequence to be executed. A program, which has already been executed, is deleted from the memory. Thereby, not all contents of the program are written in the memory during the program execution, but only a part of the program is written in the memory during the execution. Therefore, even when a malicious third party has fraudulently acquired the image copy of the content of the memory, since the content of the whole program is not acquirable, the program content can not be analyzed, and thereby it becomes possible to ensure the security of the program to be executed.

In the information processing apparatus, the storage means may further store information on division of the program correspondingly to the stored program, and the secure module may be designed to divide the received program into a plurality of programs based on the information on division of the program.

In this information processing apparatus, the secure module divides the program based on the information on division of the program, for example segment unit, which is stored correspondingly to the divided program to receive, and returns them to the executable state by the divided program. Thereby, the program can be properly divided based on the stored information on division of the program, and it is possible to avoid generating a state where a number of divided programs are written in the memory, for example because of the segment unit being improper. Therefore, even when a malicious third party has fraudulently acquired the image copy of the content of the memory, it is possible to make the analysis of the program content more difficult, and thereby it becomes possible to ensure the security of the program to be executed.

Moreover, another information processing apparatus according to the present invention comprises: a memory; a CPU for executing a program written in the memory; a secure module; and storage means for storing encrypted programs. In the memory, a plurality of programs, into which a program has been divided, are kept resident before the execution. The storage means stores a call program which calls the divided program as an execution program. The call program stored in the storage means is to be transmitted to the secure module. The secure module comprises: means for receiving the call program stored in the storage means; means for returning the received call program to an executable state; means for writing the call program, which has been returned to the corresponding executable state, in the memory in a sequence for the CPU to execute the divided program; and means for deleting the call program, which has been executed by the CPU, from the memory after the execution is completed.

In this information processing apparatus, a program is divided into a plurality of encrypted programs, is returned to an executable state by the divided program, and all divided programs are written in the memory. The call program, which calls the divided program that is also link means between the programs as the execution program, is then encrypted, and the call program is returned to the executable state in a sequence to execute the divided program and is written in the memory. The call program, which has already been executed, is deleted from the memory. Thereby, although the divided program has been written in the memory during the program execution, the relationship between the divided programs is unknown. Therefore, even when a malicious third party has fraudulently acquired the image copy of the content of the memory, it is difficult to analyze the execution sequence, the execution timing or the like of the divided program, and thereby it becomes possible to ensure the security of the program to be executed.

In the information processing apparatus, the memory may further store link information which is information to specify a call relationship between the divided programs, and the secure module may be designed to detect the sequence to execute the divided program based on the link information.

In the information processing apparatus, the sequence of executing the divided programs can be identified based on the link information which is the information to specify the call relationship between the divided programs, and a corresponding call program is returned to the executable state according to the execution sequence of the program and is written in the memory. Thereby, only when one divided program calls other divided programs, the corresponding call program is returned to the executable state and is written in the memory. Therefore, even when a malicious third party has fraudulently acquired the image copy of the content of the memory, it is difficult to analyze the execution sequence, the execution timing or the like of the divided programs which are not related to the call program being currently written in the memory, thereby it becomes possible to ensure the security of the whole program to be executed.

The above and further objects and features of the invention will more fully be apparent from the following detailed description with accompanying drawings.

BRIEF DESCRIPTION OF THE SEVERAL VIEWS OF THE DRAWINGS

FIGS. 5A and 5B are explanatory diagrams in the case of dynamically storing a program segment in a RAM;

FIGS. 6A and 6B are explanatory diagrams of a method of executing a program segment in an information processing apparatus according to a second embodiment;

FIGS. 11, 12A and 12B are explanatory diagrams of a special code call process that a secure module performs; and FIGS. 13, 14A and 14B are explanatory diagrams about a dynamic writing process and a linking process of a program segment.

DETAILED DESCRIPTION OF THE INVENTION

Hereafter, the present invention is specifically described based on drawings which show embodiments thereof.

First Embodiment

Hereafter, an information processing apparatus according to a first embodiment of the present invention is specifically described based on the drawings. Described in this first embodiment is a case where it is embodied using one computer, for example PC, as the information processing apparatus. As a matter of course, data used in a program to be executed may have been recorded on other PCs connected through communication means, or a transportable type recording medium, such as DVD, and the communication means is not particularly limited, either.

Figure 1:
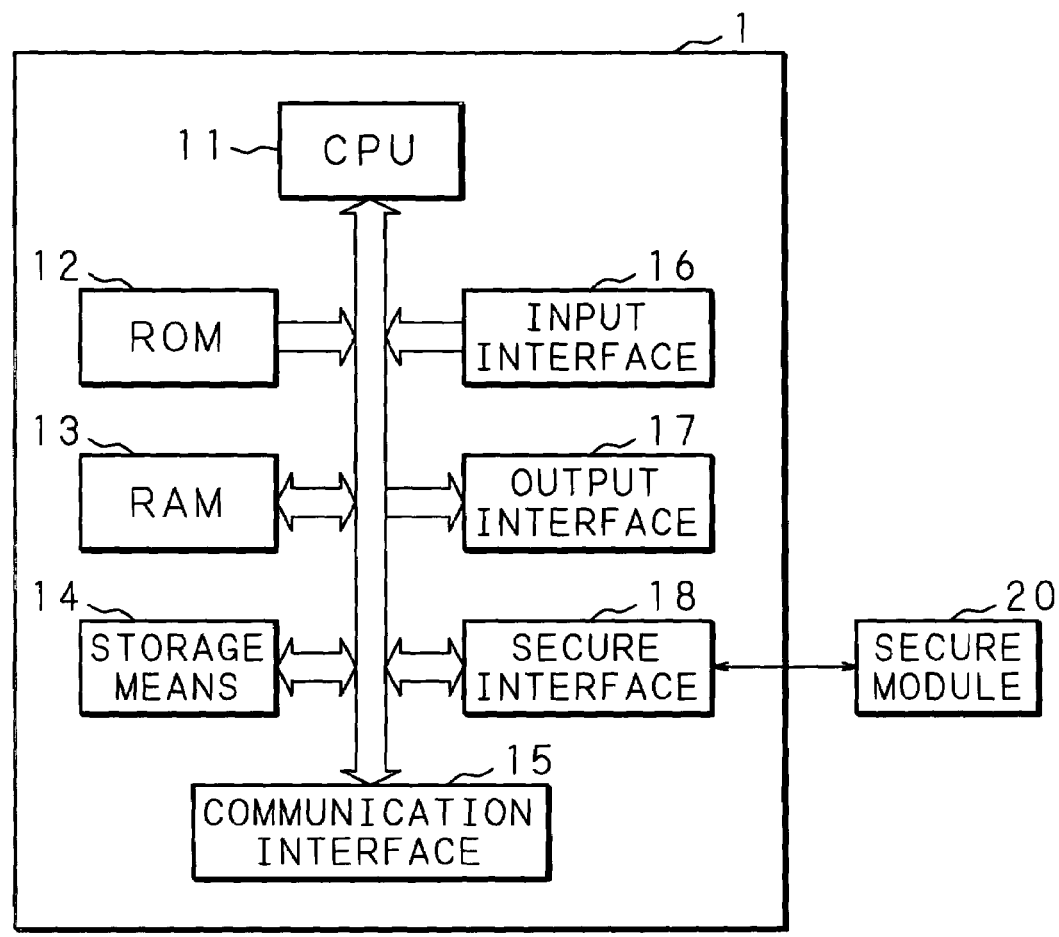
FIG. 1 is a schematic view showing a configuration of an information processing apparatus according to a first embodiment of the present invention.

FIG. 1 is a schematic view showing a configuration of the information processing apparatus according to the first embodiment of the present invention. As shown in FIG. 1, an information processing apparatus 1 comprises: a CPU (central processing unit) 11; a ROM 12; a RAM (memory) 13; storage means 14; a communication interface 15 connected to external communication means; an input interface 16 connected to input means, such as mouse or keyboard; an output interface 17 connected to output means, such as LCD, monitor or loudspeaker; and a secure interface 18 connected to a secure module 20.

The storage means 14 is a fixed type recording medium represented by a hard disk, or a transportable type record medium, such as DVD or CD-ROM, and is the storage means which records a program to be executed, data used for the program to be executed, or the like. Incidentally, the storage means is not limited to the storage means 14, and may be a ROM 12 which stores, for example, a program to be executed, data used for the program to be executed, or the like.

The information processing apparatus 1 has the secure interface 18, to which the dismountable secure module 20 is detachably mounted. The secure module 20 is connected to the secure interface 18 through, for example, a PCI bus. The secure module 20 consists of, for example, a PC card, and can access the RAM 13 independently of the CPU 11 by DMA (Direct Memory Access). The secure module 20 has a TRM (Tamper Resistant Module) structure, so that browsing of content by a third party from the outside can be prevented, and falsification of internal data can be prevented.

Figure 2:
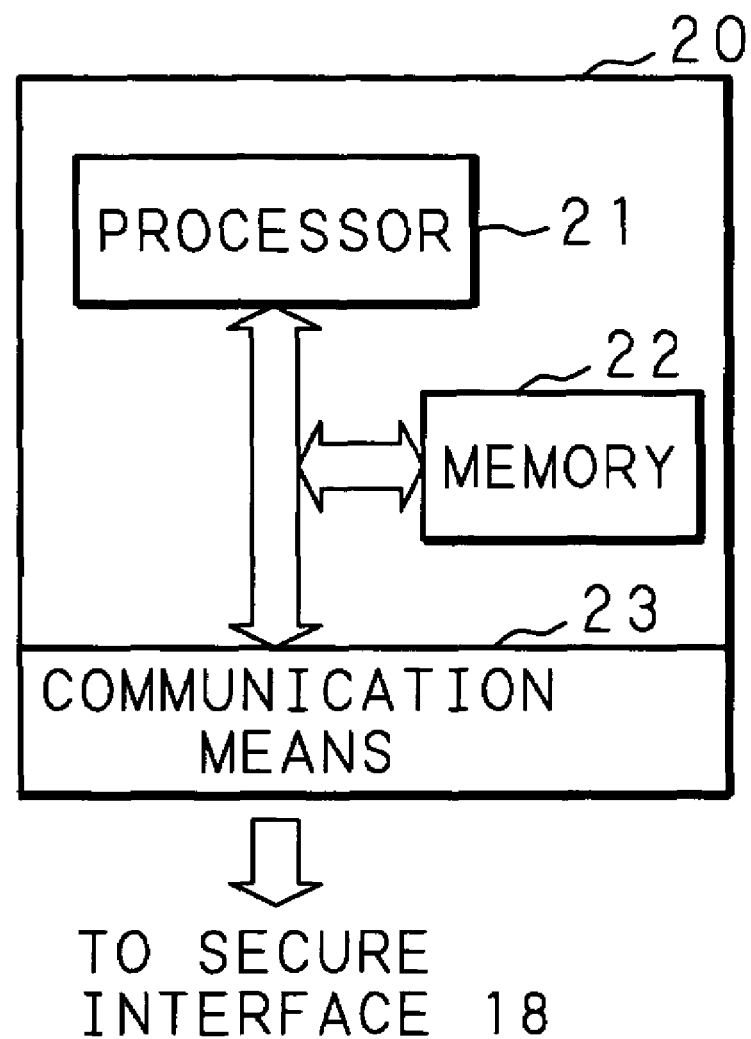
FIG. 2 is an illustrative view of a configuration of a secure module.

FIG. 2 is an illustrative view of a configuration of the secure module 20. As shown in FIG. 2, the secure module 20 comprises an LSI including a processor 21, a memory 22, and communication means 23 that communicates with the information processing apparatus 1 through the secure interface 18 of the information processing apparatus 1. The memory 22 is a nonvolatile flash memory (EEPROM) which cannot be accessed from the outside, and information which needs to be kept secret to a third party, such as information of making a program difficult to be read, encryption key, decryption key or the like is recorded therein.

The information processing apparatus 1 writes a program in the RAM 13 and executes it using the secure module 20. The storage means 14 stores a program which has been encrypted based on encryption information, for example encryption key, which is stored in the memory 22 of the secure module 20. Moreover, by transmitting the encrypted program to the secure module 20, this program can be decrypted using the encryption key stored in the memory 22. Incidentally, the information processing apparatus 1 is not limited to performing the encryption and/or the decryption by only the encryption key, and may store the encryption key and the decryption key independently.

Figure 3:
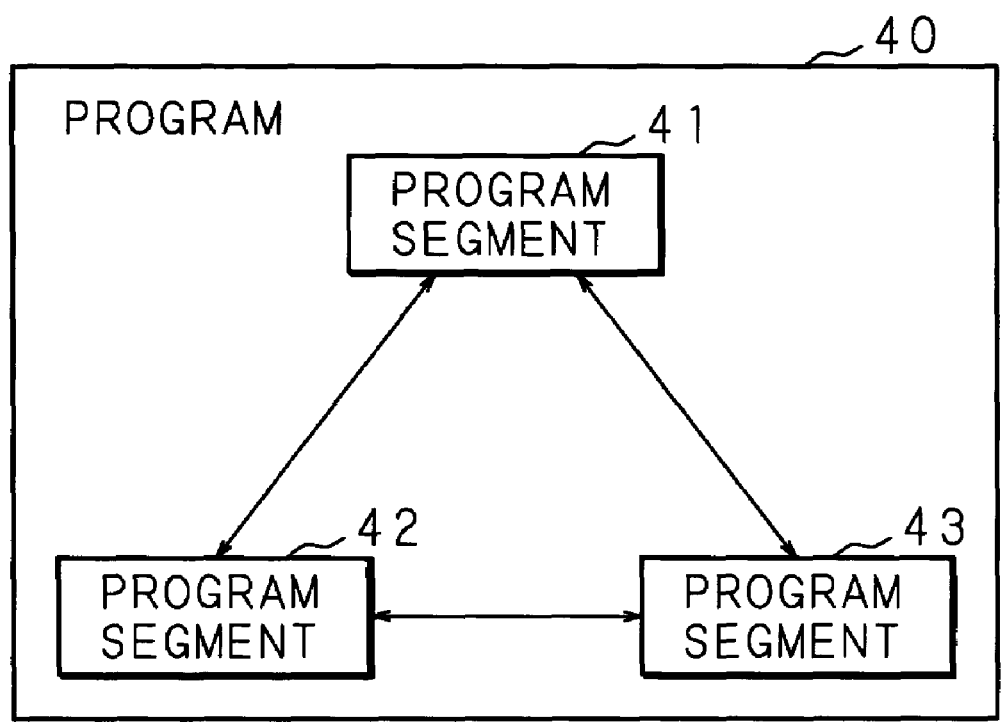
FIG. 3 is an illustrative view of division of a program.

When the program stored in the storage means 14 is executed, the encrypted program stored in the storage means 14 is first transmitted to the secure module 20. The secure module 20 decrypts the transmitted program using the encryption key stored in the memory 22, analyzes an instruction code of the program, and divides the program into a plurality of program segments. FIG. 3 is an illustrative view of division of a program. As shown in FIG. 3, divided program segments are program codes consisting of a part of a program 40. When the program 40 is operated, for example, program segments 41, 42 and 43 mutually call other program segments 41, 42 and 43, or operate as one program 40 while jumping to other program segments 41, 42 and 43. The program segment consists of one instruction of a processor as minimum unit.

Incidentally, relating to division of the program, although the secure module 20 may analyze the program and divide it into the program segments as described in this first embodiment, it is not limited to such a method. The program may be stored in the storage means 14 in advance while adding information on division of the program, for example information on the segment unit, and divided based on such information when being decrypted by the secure module 20. By dividing the program based on the information on division of the program, the program can be divided properly, and thereby it is possible to avoid generating a state where a number of the divided programs are written in the RAM 13 in an executable state because of, for example, an improper segment unit. Therefore, even when a malicious third party has fraudulently acquired the image copy of the content of the RAM 13, it is possible to make the analysis of the program content more difficult, and thereby it becomes possible to ensure the security of the program to be executed.

Moreover, at a point in time when the storage means 14 stores the encrypted program, it may be stored as a plurality of program segments. In this case, the secure module 20 decrypts the transmitted program segment using the encryption key stored in the memory 22.

The secure module 20 then writes the program segment which is a portion to operate first, for example the program segment 41, in the RAM 13. After it is written in the RAM 13, the CPU 11 executes the written program segment 41. When instruction code which requires executing other program segments exists after executing the program segment 41, the secure module 20 writes other required program segments, for example program segments 42 and 43, in the RAM 13 on a timing of executing the instruction code. The CPU 11 sequentially executes the program segments 42 and 43 which have been written in the RAM 13 after receiving a write-in completion notice.

When the execution of the written program segment is completed, the CPU 11 deletes the program segment, which has been written in the RAM 13, from the RAM 13. The whole program is not therefore written in the RAM 13, and the program is executed while only a part of program segments, which configures the program, is written in the RAM 13.

As described above, since the whole program is not written in the RAM 13, even when a malicious third party has fraudulently acquired the image copy of the RAM 13, only a part of the program segments of the whole program is written in the image copy. It is therefore difficult to grasp the whole content of the program by a reverse analysis, and thereby it becomes possible to ensure the security of the program to be executed.

Here, the secure module 20 operates independently of the CPU 11. The program written in the RAM 13 therefore needs to notify the timing, when other program segment is required, to the secure module 20. As means for the CPU 11 to notify the timing of requiring other program segments to the secure module 20, various methods are used. For example, when the program to be executed is a program having a structure capable of synchronizing the execution timing to the secure module 20, a method for the secure module 20 to write the corresponding program segment in the RAM 13 just before executing the program segment that this program requires is used.

Figure 4A:
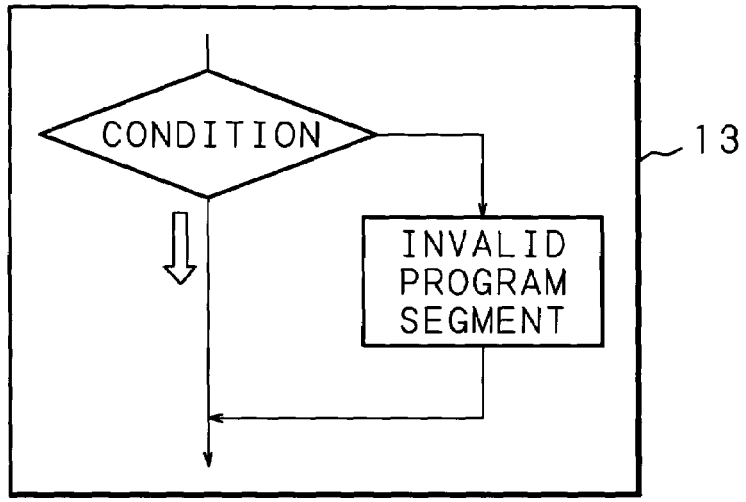
FIGS. 4A through 4C are explanatory diagrams of a method of storing a program segment in a RAM.
Figure 4B:
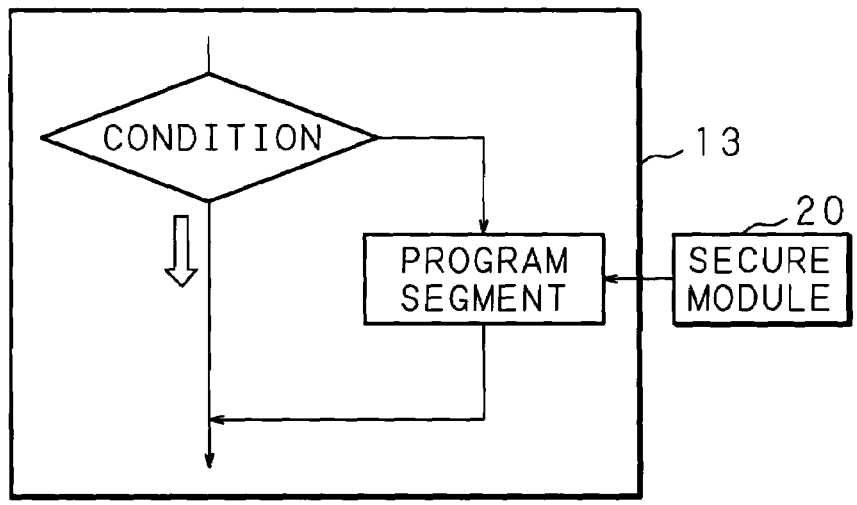
Figure 4C:
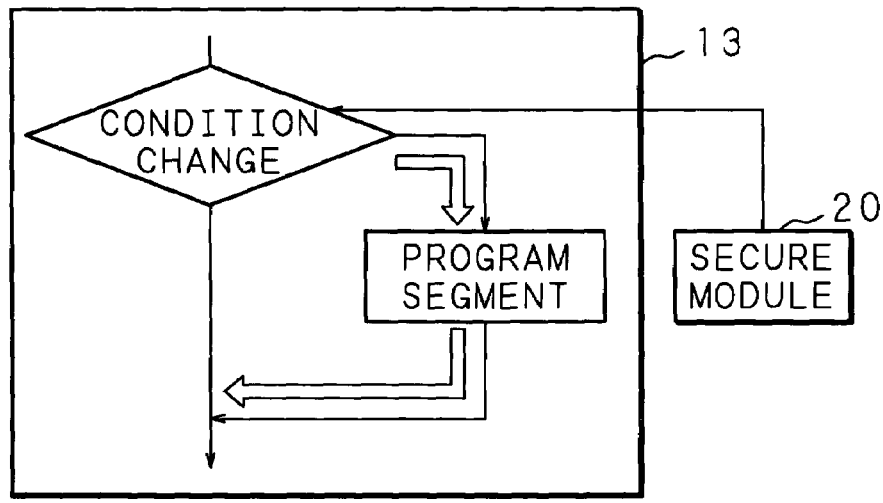

FIGS. 4A through 4C are explanatory diagrams of the method where the secure module 20 writes the corresponding program segment in the RAM 13 just before executing the program segment that the program to be executed requires. As shown in FIG. 4A, a conditional branch instruction is set in the program. A constant value is set as a condition of this conditional branch instruction, so that one path is surely selected. The invalid program segment is arranged at the other path. The invalid program segment is inoperable program code, such as nop string or zero string. Incidentally, a writable area for the required program segment is secured in the area in which the invalid program segment is arranged.

On a timing when the execution of the program segment which has not been written in the RAM 13 is needed, that is, at a point in time when the execution request instruction of the program segment is executed by the program, the secure module 20 writes the required program segment in the writable area of the program segment of the area of the RAM 13 in which the invalid program segment has been arranged, as shown in FIG. 4B. Incidentally, after the program segment is written in the RAM 13, the condition of the conditional branch instruction of the program, which has required this program segment, is changed as shown in FIG. 4C, and thereby the other path is selected, so that the CPU 11 executes the written program segment.

When the program to be executed is a program not having a structure which is capable of synchronizing the execution timing to the secure module 20, the secure module 20 inserts the execution request program, which requires the execution of the program segment, in the program at a point in time of writing the program in the RAM 13. The secure module 20 writes the corresponding program segment in the RAM 13 according to the execution of the inserted execution request program.

Information on which program segment of the program should be always written in the RAM 13, and on when and which program segment of the program should be written in the RAM 13, is stored in the secure module 20 in advance as write information. Thus, it is possible to avoid the program segment, which manages important secret information, from being kept residing in the RAM 13, and the security can be further enhanced. There are three types of information as the write information: "always written in the RAM 13", "writing in the RAM 13 during the execution" and "selected by the secure module".

FIGS. 5A and 5B are explanatory diagrams in the case of dynamically writing the program segment in the RAM 13. As shown in FIG. 5A, when the program execution starts, the program segment 41 is written in the RAM 13. The program segment 42 is not written in the RAM 13, but an execution request program 50, which performs the execution request of the program segment 42 for the secure module 20, is written in the RAM 13. The execution request program 50 may be generated by the secure module 20, may be recorded on the secure module 20 in advance, or may be transmitted to the secure module 20 with a program which has been stored in the storage medium 14 and encrypted. The program segment 41 is not a program to call the program segment 42, but a program to call the execution request program 50.

When the program is executed, the program segment 41 finally calls the execution request program 50. When the execution request program 50 is executed, the secure module 20 writes the required program segment 42 in the RAM 13 as shown in FIG. 5B. After the program segment 42 is written in the RAM 13 by the secure module 20, by executing the program segment 42 with the CPU 11, the program segment 42 can be executed in a similar way to a case where the program segment 42 is directly called from the program segment 41.

In order to detect the write-in completion of the program segment 42 in the RAM 13, the secure module 20 sets an instruction of generating an exception handling at the bottom of the execution request program 50. When the CPU 11 executes the execution request program 50 and the instruction of generating the exception handling being set at the bottom, the CPU 11 once stops the execution of the program, and waits until the secure module 20 completes the write-in in the RAM 13. The CPU 11 then executes the program segment 42 after detecting that the secure module 20 has completed the write-in, with an interruption notice, polling or the like. Thus, since the secure module 20 adds the instruction, which generates the exception handling, such as interruption instruction violation or access violation, to the execution request program 50, and only executes the execution request program 50, it becomes difficult to identify the program which is performing the standby process, for example like a case of directly calling the program which performs a standby process of the program. It becomes therefore possible to wait for the completion of writing the program segment in the RAM 13 in the form becoming more difficult for a third party to analyze it.

According to this first embodiment, as described above, the secure module 20 divides the program into a plurality of program segments, writes them in the RAM 13 by the divided program segment, and executes them. Therefore, even when the image copy of the RAM 13 has been acquired by a malicious third party, it is difficult to grasp the whole image of the program, and thereby it becomes possible to ensure the security of the program.

Second Embodiment

Although the information processing apparatus 1 according to a second embodiment has a configuration similar to that of the first embodiment, the program segment itself is not dynamically written in the RAM 13 from the secure module 20 like the first embodiment, but the program segment is always written in the RAM 13, and only a call address of the other program segments in each program segment is updated. FIGS. 6A and 6B are explanatory diagrams of a method of executing the program segment in the information processing apparatus according to this second embodiment.

As shown in FIG. 6A, at a point in time when the first program is written in the RAM 13, an invalid address is recorded in a portion where the program segments 42 and 43 are called from the program segment 41. Therefore, even when a third party that has acquired the image copy analyzes it, it becomes uncertain that program segment is called by the program segment 41 during program execution. Subsequently, as shown in FIG. 6B, at a timing of calling the program segments 42 and 43 from the program segment 41, the secure module 20 rewrites the call address in the program segment 41 with an address where the program segment to be executed next exists. As a result, the program segment 42 is called from the program segment 41, and the program segment 42 can be executed.

According to this second embodiment, as described above, since the program segment itself is not written in the RAM 13 like the first embodiment, but only rewriting the call address is performed, it is possible to perform the address rewrite in a short time compared with a time for writing the program segment in the RAM 13, and thereby it becomes possible to shorten the whole processing time.

Incidentally, by combining the first and the second embodiments, rewriting a called address of a caller program segment and writing the program segment in the RAM 13 may be performed simultaneously, so that the program segment is dynamically written in the RAM 13 and the call address is changed whenever it is written in the RAM 13. Thereby, it becomes possible to further enhance the security of the program to be executed.

Third Embodiment

Figure 7:
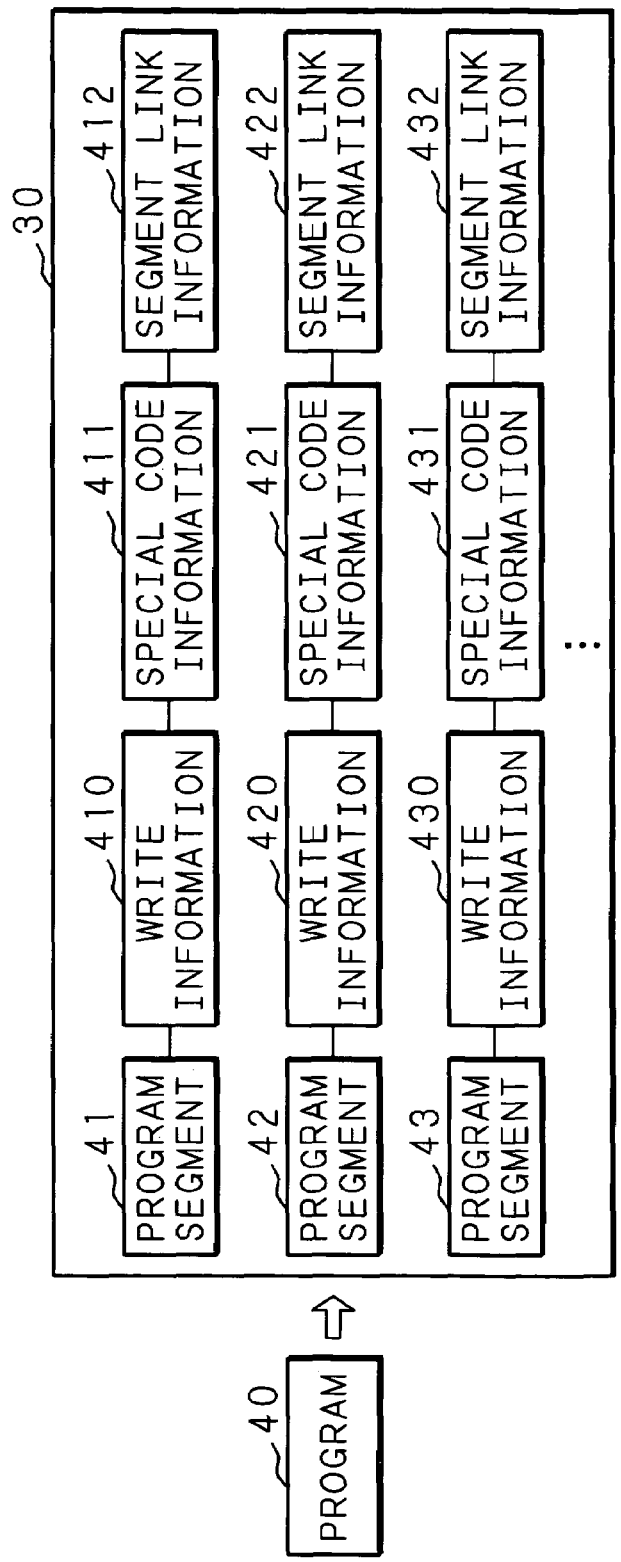
FIG. 7 is an explanatory diagram of division of a program to be executed in an information processing apparatus according to a third embodiment of the present invention into program segments.

An embodiment where a program to be executed is divided in advance and written in the RAM 13 is described in the following. FIG. 7 is an explanatory diagram of dividing a program to be executed in the information processing apparatus according to a third embodiment of the present invention into program segments. As shown in FIG. 7, the program to be executed 40 is divided into the program segments 41, 42 and 43 in advance, and additional information, which consists of write information 410, 420 and 430, special code information 411, 421 and 431, and segment link information 412, 422 and 432, is stored correspondingly to the divided program segments 41, 42 and 43, respectively. The write information 410, 420 and 430 are information indicating a timing when the program segments 41, 42 and 43 are to be written in the RAM 13. The special code information 411, 421 and 431 are information indicating whether the program segments 41, 42 and 43 are special codes or not, and what kind of special codes they are. The segment link information 412, 422 and 432 are information to describe how the program segments are mutually called.

Figure 8:
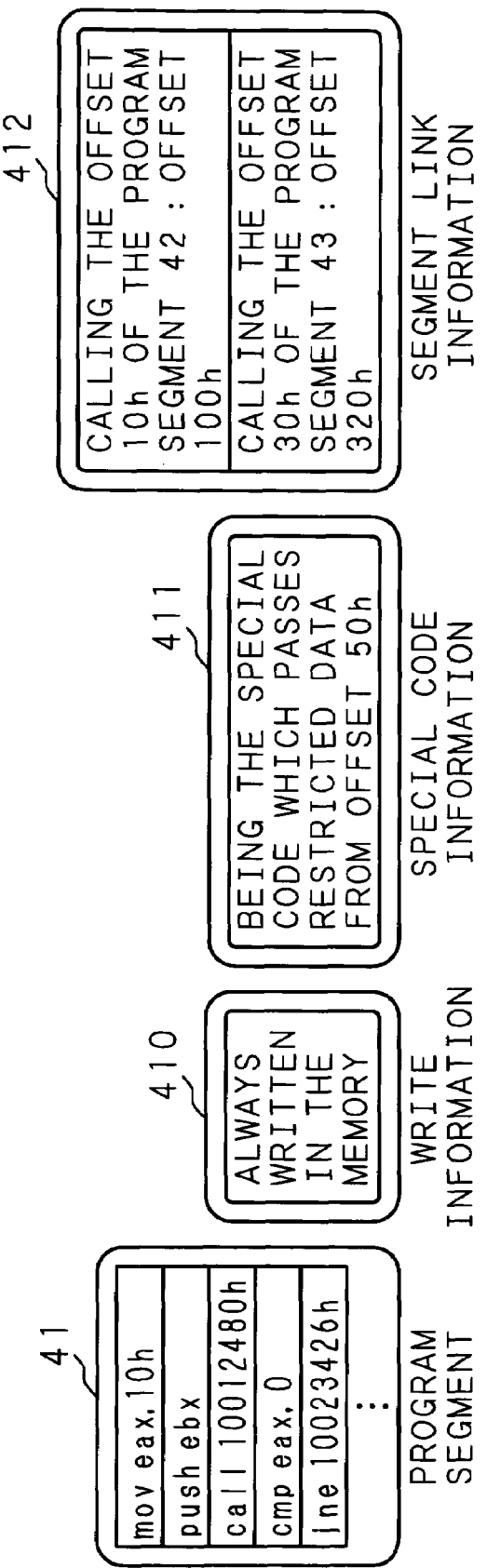
FIG. 8 is an illustrative view of write information, special code information and segment link information.

FIG. 8 is an illustrative view of the write information 410, the special code information 411 and the segment link information 412. The program segment 41 is the program code that the CPU 11 can execute. The write information 410 stores information of "always written in the memory". The special code information 411 stores information of "being the special code which passes restricted data from the address of offset 50h". The segment link information 412 stores information of "calling the offset address 10h of the program segment 42 from the address of offset 100h", and of "calling the offset address 30h of the program segment 43 from the address 320h".

Incidentally, the segment link information may also include a plurality of pieces of information. Moreover, the special code information may also include a plurality of pieces of special code information. The information on these program segments is encrypted by the encryption key stored in the memory 22 which cannot be accessed from the outside of the secure module 20, and is stored in the storage means 14 as security enhancing program data 30.

Figure 9:
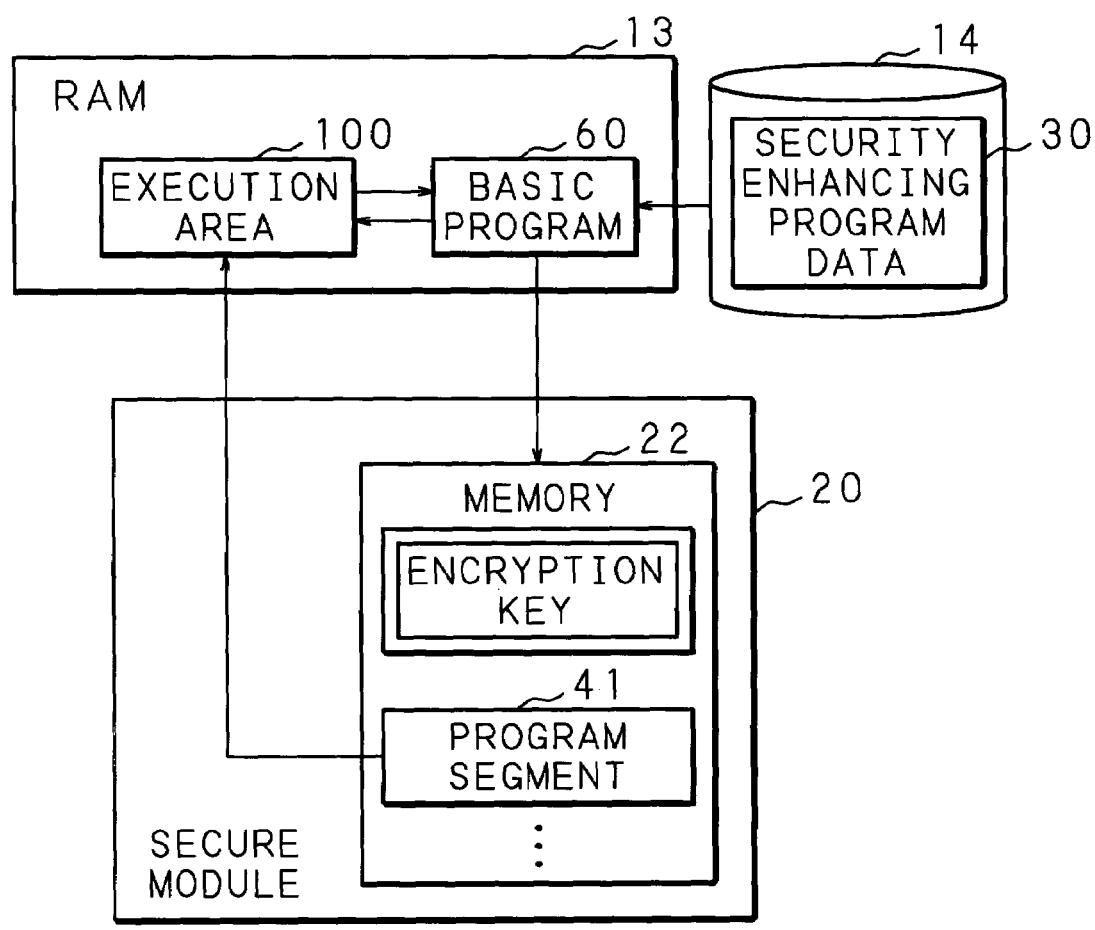
FIG. 9 is an explanatory diagram of operation at starting a program execution.

FIG. 9 is an explanatory diagram of operation of starting the program execution. When executing the program, a basic program 60 operates first. The basic program 60 reads the security enhancing program data 30 from the storage means 14. Next, the basic program 60 secures an execution area 100 in the RAM 13 for the program 40 to operate. The security enhancing program data 30 and the address of the execution area 100 which has been secured for the program execution are then passed to the secure module 20.

The secure module 20 decrypts the security enhancing program data 30 using the encryption key stored in the memory 22 which cannot be accessed from the outside. The program segment 41 to be executed is then written in the execution area 100 of the RAM 13. After processes, such as write-in process of the program segment 41 in the memory with the secure module 20 and link process, are completed before the execution starts, the CPU 11 calls a starting address of the program segment 41 from the basic program 60, and starts execution of the program segment 41.

Figure 10:
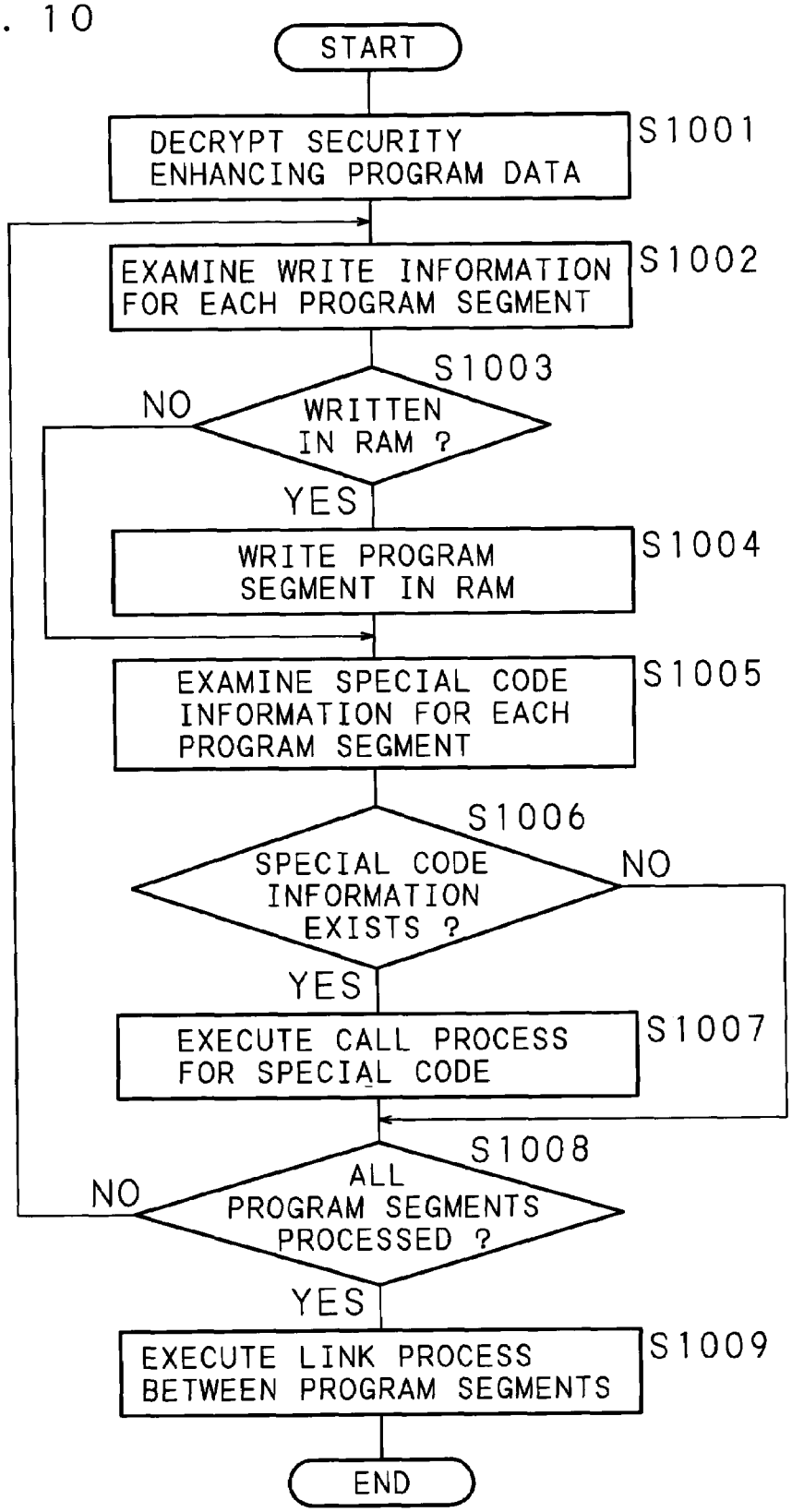
FIG. 10 is a flow chart of a process in a secure module at starting a program execution.

FIG. 10 is a flow chart of a process in the secure module 20 at starting the program execution. As shown in FIG. 10, the secure module 20 decrypts the security enhancing program data 30 using the encryption key stored in the memory 22 which cannot be accessed from the outside (operation S1001). After decrypting the security enhancing program data 30, the content of the write information added to each program segment is examined (operation S1002). When it is stored in the write information that the program segment should be written in the RAM 13 (operation S1003: YES), the stored program segment is written in the execution area 100 of the RAM 13 (operation S1004).

The secure module 20 then examines the existence of the special code information of the program segment (operation S1005). When the special code information exists therein (operation S1006: YES), the call process according to the special code is executed (operation S1007). The details of the special code call process will be described later. The processes described above are repeated for all program segments (operation S1008).

When the processes described above are completed for all program segments (operation S1008: YES), the link process between the program segments is executed (operation S1009). The details of the link process between the program segments will be also described later. At a point in time when the link process is completed, the preparation of the program execution is completed. The fact that the preparation of the program execution has been completed is notified to the information processing apparatus (PC) 1 with an interruption process, a status register or the like.

Figure 11:
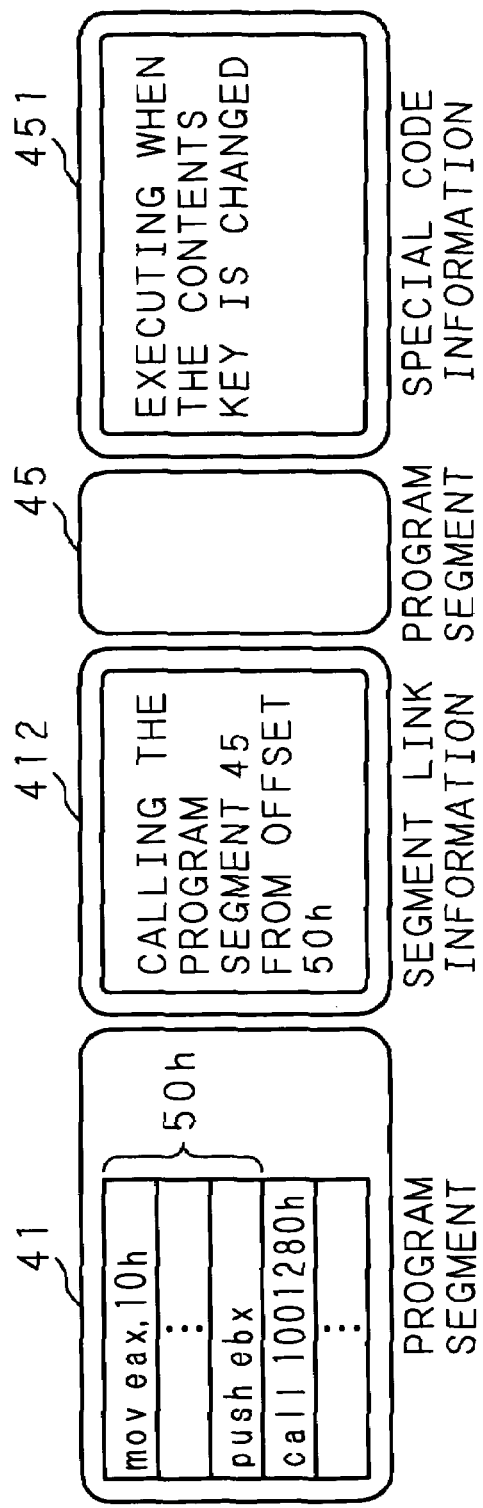

The special code call process that the secure module 20 performs is a program code call process of a portion for the secure module 20 to control operation timing. FIGS. 11, 12A and 12B are explanatory diagrams of the special code call process that the secure module 20 performs. FIG. 11 is an illustrative view of the special code information, the link information or the like. In an example of FIG. 11, the segment link information 412 of "calling the program segment 45 from the address of offset 50h" is added to the program segment 41. Moreover, the program segment 45 includes the special code information 451 of "executing when the contents key is changed".

The secure module 20 writes a special code call section 80 in the RAM 13, and links so as to call the special code call section 80 from the program segment 41. The special code call section 80 may be automatically generated by the secure module 20, or may be included in the security enhancing program data 30 as the program segment.

The special code call section 80 written in the RAM 13 consists of data which is accessed from a conditional branch, a conditional branch code, and a portion which calls the special code. FIG. 12A shows an example, in which the special code call section 80 is written in the address 13845fa0h. The data accessed by the conditional branch is embedded in the top thereof.

Usually, a value which is embedded in the top thereof and accessed by the conditional branch is zero. As long as an execution condition of the special code is not satisfied, the value remains at zero. In the conditional branch of FIG. 12A, when the value stored in the address 13845fa0h is zero, return is performed immediately. Therefore, even when the special code call section 80 is called from the program segment 41, as long as the execution condition of the special code is not satisfied, the return can be performed immediately.

When the value accessed by the conditional branch is not zero, a following program code is executed. The following program code consists of code which sets zero in a value accessed by the branch condition, and code which calls the execution area 100 of the program. At the time of an initial write-in at starting the program execution, invalid program data is written in the execution area 100 of the program.

When the execution condition of the special code is satisfied during program execution, the secure module 20 writes the special code, which satisfies the execution condition, in the execution area 100. In an example of FIG. 12B, since the special code is code of being "executed when the content key is changed", the secure module 20 writes the program segment 45 in the execution area 100 just before the contents key is changed. After writing the program segment 45, the data referred to from the conditional branch of the address 13845fa0h is rewritten. By rewriting it, it will be in a state where the execution condition of the special code is satisfied. When the special code call section 80 is executed in a state where the execution condition of the special code is satisfied, the code which sets zero in the value referred to by the conditional branch, and the code which calls the program segment 45 are executed without performing the return immediately.

Figure 13:
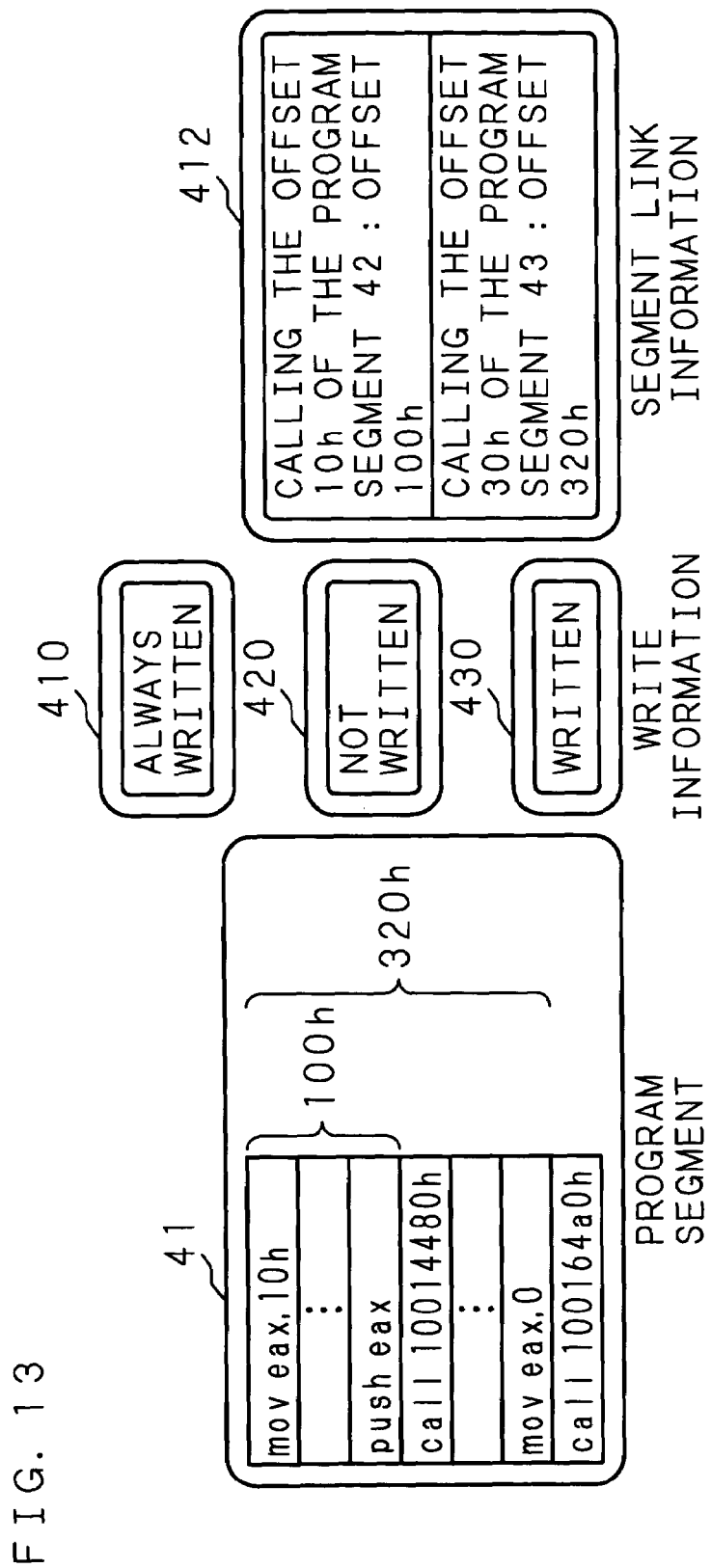

Next, a program linking process that the secure module 20 executes is described. The program linking process is a process of dynamically writing an arbitrary program segment. FIGS. 13, 14A and 14B are explanatory diagrams about a dynamic write-in process and a link process of the program segment. FIG. 13 is an illustrative view of write information, link information or the like in the write-in process and the link process with regard to the program segment 41.

In an example of FIG. 13, the segment link information 412 corresponding to the program segment 41 shows that the program segment 41 includes the call of the program segment 42 and the program segment 43. Referring to each of write information 420 and 430, it is described that the program segment 42 is not written in the RAM 13 until the execution starts, but the program segment 43 is written in the RAM 13 when the execution starts. Since the program segment 43 is the code which is always written in the RAM 13, when the execution of the program segment 41 starts, the call of the program segment 43 is executed from the program segment 41.

In FIG. 14A, the program segment 43 is written in an area of the address 13900000h of the RAM 13. The address of the program segment 43 is then set to the call command of the program segment 43 in offset 320h of the program segment 41. In this embodiment, since the offset 30h of the program segment 43 is called, the called address of the call command is set to the program segment 41 so that the address 13900030h can be called.

Meanwhile, since the program segment 42 is not written in the RAM 13 when the execution of the program segment 41 starts, an execution request code of the program segment 42 is written in the RAM 13, and the execution request code is called from the program segment 41. The execution request code is achieved by, for example, a write-in program in a register address of the secure module 20.

Codes which generate the exception handling, a "cache flash" instruction, and call code of the main body of the program segment 42 are included in the bottom of the execution request code. In this embodiment, although an "int 3" instruction is used as the code which generates the exception handling, code which causes the exception handling other than this, for example a memory access violation, may be used. Moreover, an address in which the program segment 42 is written is set as not being constant and an invalid value is stored in the call address. Furthermore, the cache is once cleared using the "cache flash" instruction, so that the call address that the secure module 20 has set up is called certainly. Since the "cache flash" instruction depends on architecture, it cannot be used according to the architecture.

If the execution of the program is started, as shown in FIG. 14B, when the program segment 41 is executed and the execution request code of the program segment 42 is executed, the write-in of the program segment 42 in the RAM 13 is required from the PC to the secure module 20. The program then executes the next exception handling generation code (int 3), and an interruption handler is activated. The interruption handler waits until an interruption process of the program write-in completion from the secure module 20 is generated, and after the interruption process is generated, following code is set to be executed. The secure module 20 which has received the execution request sets up the called address of the caller while writing the program segment 42 in the RAM 13.

In this embodiment, while writing the program segment 42 in an area of the address 13A00000h, the called address is set to the address 13A00010h (offset 10h of the program segment 42). With regard to the write-in of the program segment 42, it may be written in advance, or the call address of the program segment 42 may be fixed.

In the method of using the conventional technology of making the program to be executed secure or difficult to be read, there is eventually no difference from describing it as a program which operates on the open architecture no matter how effectively the program is made difficult to be read or is secured. Therefore, since it is possible to analyze the content of the program to be executed by performing the reverse analysis of the program code written in the memory and investigating instructions, data or the like according to the well-known open architecture, a fraudulent attack by a third party cannot be prevented.

Moreover, even when the method of writing the program in the memory and executing it using the secure module is employed, there is no difference from writing the program in the memory in a processor executable format. It is therefore possible to analyze the content of the program to be executed by acquiring the image copy of the content in the memory and analyzing the content in the memory based on the image copy.

As described above, in the present invention, by dynamically writing the program in the RAM or dynamically changing the call address of the program using the secure module, it becomes possible to execute the program in the difficult form for a malicious third party to analyze it.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. An information processing apparatus comprising:
a first storage unit;
a processor configured to execute a program written in the first storage unit;

a second storage unit configured to store a plurality of encrypted program segments into which the program is divided; and a secure module capable of performing operations of:

receiving each of the encrypted program segments stored in the second storage unit;

returning each of the received encrypted program segments to an executable state;

writing each of the encrypted program segments, which have each been returned to the executable state, in the first storage unit in a sequence for the processor to execute; and deleting each of the returned encrypted program segments, which have each been executed by the processor, from the first storage unit after execution is completed, wherein the processor transmits the encrypted program segments stored in the second storage unit to the secure module.

2. The information processing apparatus according to claim 1, wherein the secure module includes a processor configured to judge whether or not an execution request signal for a divided program has been received and to return each of the received encrypted program segments to the executable state when it is judged that the execution request signal has been received.

3. The information processing apparatus according to claim 2, wherein the processor is further configured to store information for identifying each divided program and to judge whether each divided program is a program that is to be kept resident in the first storage unit before program execution or a program that is not to be written in a memory before execution.

4. The information processing apparatus according to claim 1, wherein the secure module includes a processor that is configured to store information for identifying each divided program and to judge whether said divided program is a program that is to be kept resident in the first storage unit before program execution or a program that is not to be written in a memory before execution.

5. An information processing apparatus comprising:

a first storage unit;

a processor configured to execute a program written in the first storage unit;

a second storage unit configured to store a plurality of encrypted program segments into which the program is divided and rewrites itself with invalid code just before the program is completed; and a secure module capable of performing operations of:

receiving each of the encrypted program segments stored in the second storage unit;

returning each of the received encrypted program segments to an executable state;

writing each of the encrypted program segments, which have each been returned to the executable state, in the first storage unit in a sequence for the processor to execute; and deleting each of the returned encrypted program segments, which have each been executed by the processor, from the first storage unit after execution is completed, wherein the processor transmits the encrypted program segments stored in the second storage unit to the secure module.

6. The information processing apparatus according to claim 5, wherein the secure module includes a processor configured to judge whether or not an execution request signal for a divided program has been received and to return each of the received encrypted program segments to the executable state when it is judged that the execution request signal has been received.

7. The information processing apparatus according to claim 6, wherein the processor is further configured to store information for identifying each divided program and to judge whether each divided program is a program that is to be kept resident in the first storage unit before program execution or a program that is not to be written in a memory before execution.

8. The information processing apparatus according to claim 5, wherein the secure module includes a processor that is configured to store information for identifying each divided program and to judge whether said divided program is a program that is to be kept resident in the first storage unit before program execution or a program that is not to be written in a memory before execution.

9. An information processing apparatus comprising:

a first storage unit;

a processor configured to execute a program written in the first storage unit;

a second storage unit configured to store an encrypted program; and a secure module capable of performing operations of:

receiving the encrypted program stored in the second storage unit;

dividing the received encrypted program into a plurality of encrypted programs segments;

returning each of the encrypted program segments to an executable state;

writing each of the encrypted program segments, which have been returned to the executable state, in the first storage unit in a sequence for the processor to execute; and deleting each of the returned encrypted program segments, which have been executed by the processor, from the first storage unit after execution is completed, wherein the processor transmits the program stored in the second storage unit to the secure module.

10. The information processing apparatus according to claim 9, wherein the second storage unit is further configured to store information on division of a program correspondingly to the stored program, and the secure module divides the received program into a plurality of encrypted program segments based on the information on division of the program.

11. An information processing apparatus comprising:

a first storage unit;

a processor configured to execute a program written in the first storage unit;

a second storage unit configured to store an encrypted program; and a secure module cable of performing operations of:

receiving the encrypted program stored in the second storage unit;

dividing the received encrypted program into a plurality of encrypted program segments and making each of the plurality of encrypted program segments to be a program that rewrites itself with an invalid code just before the program is completed;

returning each of the encrypted program segments to an executable state; and writing each of the encrypted program segments, which have been returned to the executable state, in the first storage unit in a sequence for the processor to execute, wherein the processor transmits the program stored in the second storage unit to the secure module.

12. The information processing apparatus according to claim 11, wherein
the second storage unit is further configured to store information on division of a program correspondingly to the stored program, and
the secure module divides the received program into a plurality of programs based on the information on division of the program.

13. An information processing apparatus comprising:
a first storage unit where a plurality of encrypted program segments, into which an encrypted program has been divided, are kept resident before execution;
a processor configured to execute each of the encrypted program segments written in the first storage unit;
a second storage unit configured to store an encrypted call program that calls the encrypted program segments as an execution program; and
a secure module capable of performing operations of:
receiving the call program stored in the second storage unit;
returning the received call program to an executable state;
writing the call program, which has been returned to a corresponding executable state, in the first storage unit in a sequence for the processor to execute a divided program; and
deleting the returned call program, which has been executed by the processor, from the first storage unit after execution is completed,
wherein the second storage unit transmits the call program stored in the second storage unit to the secure module.

14. The information processing apparatus according to claim 13, wherein
the first storage unit further stores link information that is information to specify a call relationship between the program segments, and
the secure module detects a sequence to execute the program segments based on the link information.

15. An information processing apparatus comprising:
a first storage unit where a plurality of encrypted program segments, into which an encrypted program has been divided, are kept resident before execution;
a processor configured to execute the encrypted program segments written in the first storage unit;
a second storage unit configured to store an encrypted call program, which calls the encrypted program segments just before each program is completed as each execution program that rewrites itself with invalid code; and
a secure module capable of performing operations of:
receiving the call program stored in the second storage unit;
returning the received call program to an executable state; and
writing the call program, which has been returned to the corresponding executable state, in the first storage unit in a sequence for the processor to execute program segments;
wherein the second storage unit transmits the call program stored in the second storage unit to the secure module.

16. The information processing apparatus according to claim 15, wherein
the first storage unit further stores link information that is information to specify a call relationship between the program segments, and
the secure module detects a sequence to execute the program segments based on the link information.

* * * * *